United States Patent [19]
Walker

[11] 3,854,244
[45] Dec. 17, 1974

[54] DAMPER AND SPRING-BIAS MECHANISM FOR VEHICLE GATES

[75] Inventor: Raymond Andre Walker, Orange, Calif.

[73] Assignee: Stang Hydronics Inc., Orange, Calif.

[22] Filed: Aug. 28, 1973

[21] Appl. No.: 392,206

[52] U.S. Cl............................ 49/131, 49/386, 49/373
[51] Int. Cl................................................ E06b 11/04
[58] Field of Search.............. 49/131, 386, 273, 274

[56] References Cited
UNITED STATES PATENTS

| | | | |
|---|---|---|---|
| 1,551,340 | 8/1925 | Smith | 49/131 |
| 2,758,399 | 8/1956 | Youle et al. | 49/131 X |
| 3,296,741 | 1/1967 | Lubmann | 49/131 |
| 3,303,613 | 2/1967 | Seuntjens | 49/131 |

FOREIGN PATENTS OR APPLICATIONS

| | | | |
|---|---|---|---|
| 283,025 | 5/1968 | Australia | 49/131 |

*Primary Examiner*—Kenneth Downey
*Attorney, Agent, or Firm*—Richard L. Gausewitz

[57] ABSTRACT

A pair of tension springs are connected and oriented in such manner, relative to a horizontal-axis vehicle gate, that the gate is effectively and economically spring-biased to a predetermined closed position. A precisely-controllable hydraulic damper mechanism prevents the spring-biased gate from bumping the undersides of motor vehicles passing thereover, and then releases to achieve the combined benefits of (1) minimized time period during which the gate remains open after vehicles pass thereover, and (2) maximized effectiveness relative to the latching mechanism of the gate. The release means compensates automatically for conditions under which long tandem trucks, or strings of automobiles or trucks, pass over the gate. Such automatic compensation, and other types of damper operation, are achieved without causing cavitation of the hydraulic fluid.

9 Claims, 6 Drawing Figures

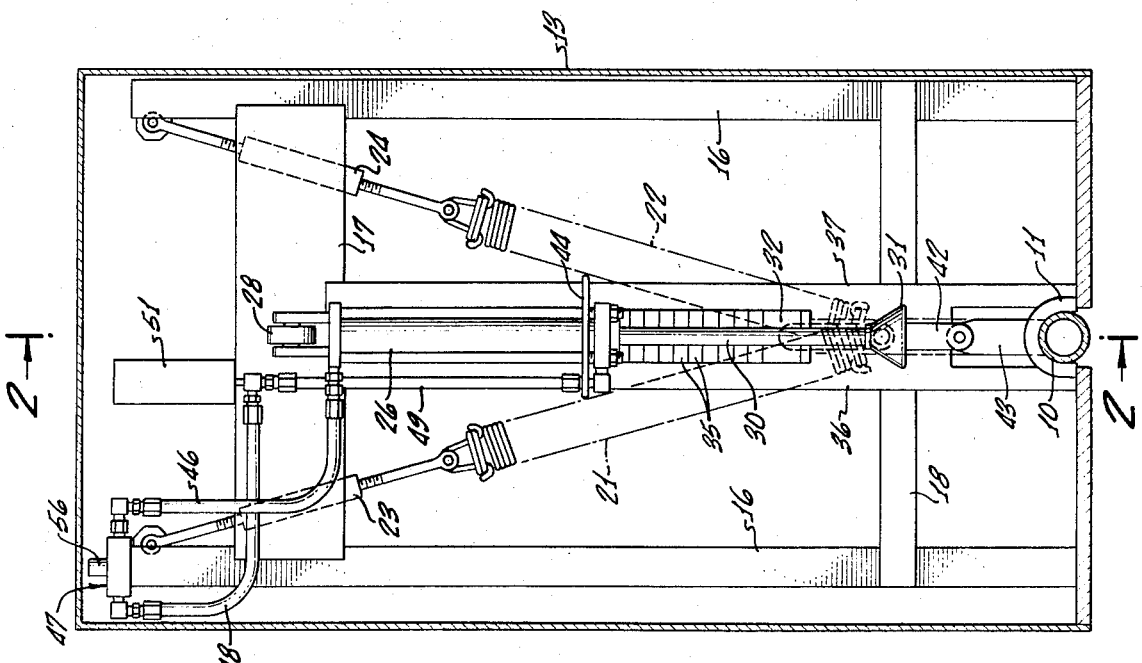
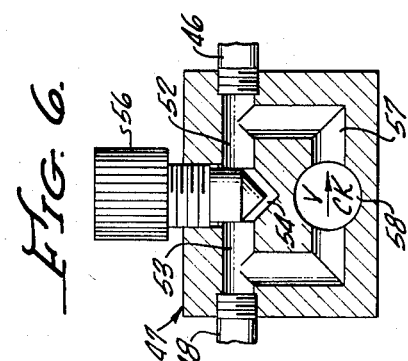
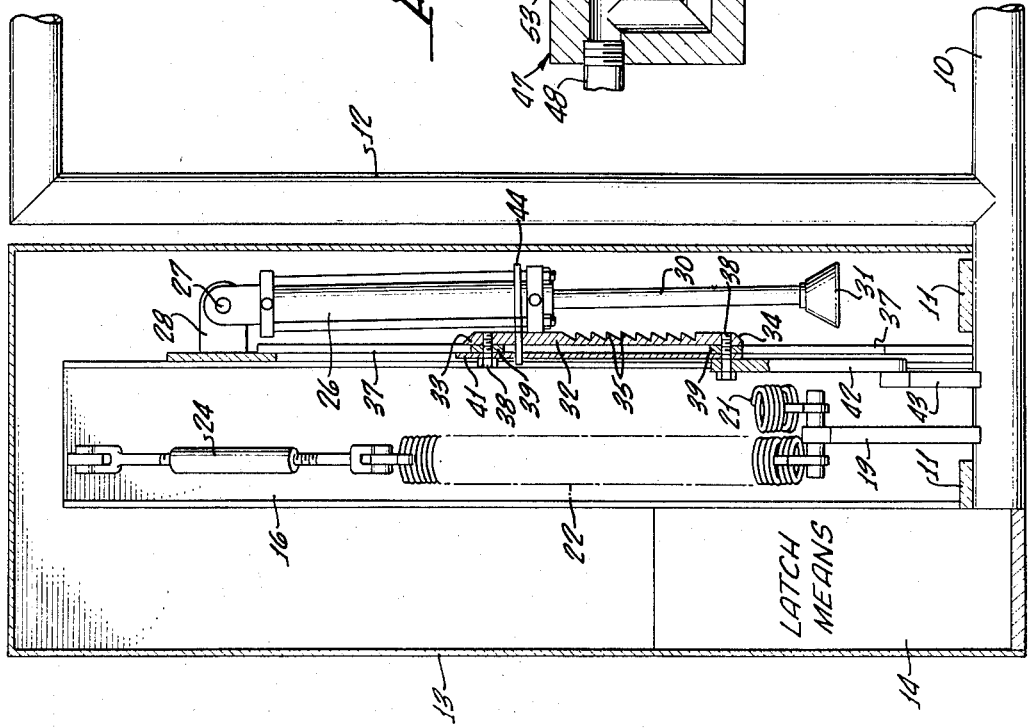

DAMPER AND SPRING-BIAS MECHANISM FOR VEHICLE GATES

BACKGROUND OF THE INVENTION

1. Field of the Invention

This invention relates to the field of vehicle gates, of the horizontal-axis type which are pushed over and then driven over by trucks and other motor vehicles. More specifically, this invention relates to damper and spring-bias means for such gates.

2. Description of Prior Art

Prior-art reference is hereby made to the copending patent application of John H. Walls, Ser. No. 233,471, filed Mar. 10, 1972, for Horizontal-Axis Vehicle Gate Incorporating Locking Mechanism now U.S. Pat. No. 3,790,976 issued Feb. 2, 1974. The apparatus described in said patent application, and other prior-art apparatus, incorporate gravity or spring means to bias the gate toward the closed position. Some such apparatus also include dampers which serve to retard the rate of gate closing. However, all of these bias and damper means have major disadvantages in comparison to the apparatus described in the present application.

It is important that the gate be prevented from springing up so rapidly that it bumps on the undersides of vehicles passing thereover. Such bumping is annoying to the drivers, and may damage the vehicles. Furthermore, an occasional vehicle may actually hang up on the gate, which stops the vehicle suddenly and may cause injury to the driver. However, it is also important that the gate not "creep" upwardly to its closed, vertical position with excessive slowness. Such slowness can, for example, permit livestock to escape through the gate after a vehicle passes therethrough. Furthermore, and very importantly, such slowness can prevent the gate from latching at all.

When a gate pivots very slowly, frictional forces become important. Such frictional forces become of great importance when the gate is near its vertical (closed) position, because the return force exerted by the spring-bias means is then the least. It follows that the combination of friction drag and weakening spring-return force may prevent the gate from closing fully and then latching. If it sought to overcome the nonclosing and nonlatching tendency of a slow-moving gate by increasing the spring-return force, then other major disadvantages result. These disadvantages include excessive force requirements relative to gate opening, and excessive bearing loads in the bearings for the gate.

The optimum horizontal-axis vehicle gate will not require excessive spring bias, will close at the correct rate of speed, will close and latch in fail-safe manner after a vehicle passes therethrough, and will not bump the undersides of substantial numbers of vehicles. Because of variations in frictional conditions, it is important that means be provided which will permit accurate control of the damper action and thus of the rate of gate-return movement. It is also important that the damper means be of such type that cavitation of the hydraulic fluid will not result. Cavitation, the generation of gas or vapor bubbles in the hydraulic fluid, is a major problem in that it causes the damper to operate erratically and improperly. Such cavitation often results when a piston is shifted rapidly in a direction causing generation of suction or vacuum in the hydraulic cylinder.

SUMMARY OF THE INVENTION

The present damper and spring-bias mechanism solves all of the above problems, and in a manner which is practical, rugged and economical. As the return spring means for the gate, the invention employs two tension springs oriented at an acute angle to each other, and connected to cause effective return and centering of the gate. As the damper means, the invention provides a hydraulic cylinder and an associated flow-control valve for the hydraulic fluid. The piston of the cylinder is associated with the gate through a cam and ratchet mechanism achieving numerous advantages. These advantages include (a) automatic release of the damper at a predetermined time, so that the gate then springs up to the closed and latched condition without regard to frictional drag forces, and (b) automatic operation to different ratchet positions when additional sets of wheels pass over the gate, the result being that there is then no sudden pulling on the piston with consequent cavitation effects relative to the hydraulic fluid. Advantage (a) permits the springs ot be relatively weak, so that they may be economical and so that excessive forces and bearing loads are not required for opening of the gate.

BRIEF DESCRIPTION OF THE DRAWINGS

FIG. 1 is a vertical sectional view taken perpendicularly to the longitudinal axis of the closed gate, and illustrating the damper and spring-bias mechanism of the present invention;

FIG. 2 is a fragmentary longitudinal sectional view on line 2—2 of FIG. 1;

FIG. 6 is a schematic vertical sectional view illustrating the flow-control valve for the hydraulic fluid.

DETAILED DESCRIPTION OF THE PREFERRED EMBODIMENT

Figure 3:
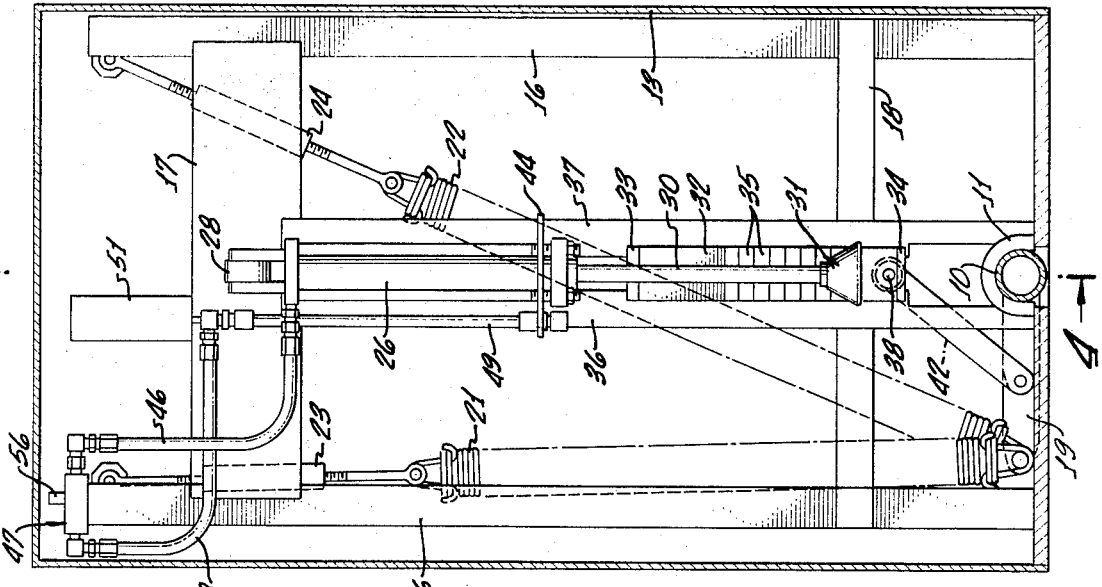
FIG. 3 is a view corresponding to FIG. 1 but showing the gate in the position it assumes just after a vehicle has pushed the gate to fully open condition.

The present invention is incorporated in the horizontal-axis vehicle gate of the type described and claimed in my copending patent application Ser. No. 392,205, filed on even date herewith, for a Vehicle Gate Mechanism. Said application is hereby incorporated by reference into the present application, as though set forth in full. There is also hereby incorporated by reference in the present application said above-cited copending patent application Ser. No. 233,471, filed Mar. 10, 1972, for Horizontal-Axis Vehicle Gate Incorporating Locking Mechanism, inventor John H. Walls, as though said application Ser. No. 233,471 were set forth in full herein.

Both of the cited copending patent applications set forth a horizontal-axis vehicle gate wherein a horizontal shaft is provided adjacent the surface of the roadway, and wherein the gate extends upwardly from the shaft in the manner of a crank thereon. Means are provided to keep the gate upright at all times except when a vehicle is passing thereover, and means are provided to damp the upward return of the gate after such passing of the vehicle thereover. Lock means and latch means, operable from stations adjacent the roadway and on opposite sides of the gate, are provided in order to effect locking and latching of the gate. The latch means automatically latch after the gate returns to upright position.

Referring to the drawings of the present patent application, the shaft of the vehicle gate is represented at 10, and is journaled in bearings 11 for rotation about a horizontal axis which is relatively adjacent the surface of the roadway. The gate is represented fragmentarily at 12 in FIG. 2 and 4, being rigidly welded to the shaft 10. Such gate comprises a barrier which may, for example, consist of a lattice of welded pipes.

At one end of the apparatus is provided a housing 13 adapted to prevent tampering with mechanisms which are associated with the gate barrier. These mechanisms include not only those described in detail in the present application, but also latch means 14 (FIGS. 2 and 4) which latch the shaft 10 against rotation when the gate 12 is in its upwardly extending closed condition. The latch means 14 are operated by a vehicle driver located at remote operating stations, as described in detail in both of the cited copending patent applications. For a detailed description of two types of latch means and associated lock mechanism, reference is made to the above-cited applications.

Frame and support means are mounted in the housing 13, and comprise two vertical posts 16 which are connected to each other by upper and lower horizontal cross members 17 and 18, respectively (the latter member 18 being interrupted by, and connected to, vertical track elements described below). A crank 19 is rigidly connected to one end of shaft 10, and is disposed in the same plane as is gate barrier 12. The outer end of crank 19 is pivotally connected to two elongated helical tension springs 21 and 22 which are disposed at an acute angle to each other when the gate is closed (FIG. 1). Turnbuckles 23—24 connect, respectively, the upper ends of springs 21-22 to the upper ends of posts 16, such connections also being pivotal. The turnbuckles 23-24 may be adjusted in order to regulate the amount of tension in the springs 21-22.

When the gate is closed, FIG. 1, springs 21-22 diverge upwardly relative to each other. They also extend upwardly and away from a vertical plane which contains the closed gate barrier 12 and its axis, and also contains the pivotal connections between the lower spring ends and the upper end at crank 19. The springs 21-22 are identical to each other and (when the gate is closed) are mirror images of each other relative to a hypothetical mirror disposed in the specified vertical plane. Springs 21-22 lie in a plane which is perpendicular to the specified vertical plane and to the gate axis. As indicated in FIG. 1, the acute angle between the upwardly diverging springs 21-22 may be on the general order of 30°.

It has been found that the described tension springs 21-22 produce very effective closing and centering of the gate. Furthermore, they are relatively economical to manufacture and install, and do not require substantial maintenance.

THE DAMPER AND CAM MECHANISM

The damper comprises a hydraulic cylinder 26 the upper end of which is pivotally connected at 27 to a bracket 28 on cross member 17. It is within the scope of the invention to provide means for adjusting vertically the bracket 28, or for adjusting vertically the pivotal connection 27, in order to determine precisely the elevation of cylinder 26. Such adjustment may be necessary, for example, when the surface of the concrete foundation for the gate is above or below a predetermined normal condition.

Figure 5:
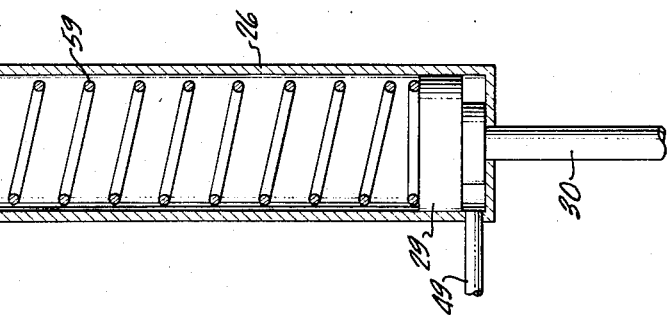
FIG. 5 is a schematic sectional view illustrating the components of the piston and cylinder means.

The piston 29 (FIG. 5) in cylinder 26 connects to a piston rod 30, and such rod 30 extends downwardly a considerable distance below the cylinder. At the lower end of the rod 30 is provided a frustoconical element 31 which serves a plurality of functions, primarily including that of a pawl. The surface of element 31 diverges in a downward direction, as illustrated.

Figure 4:
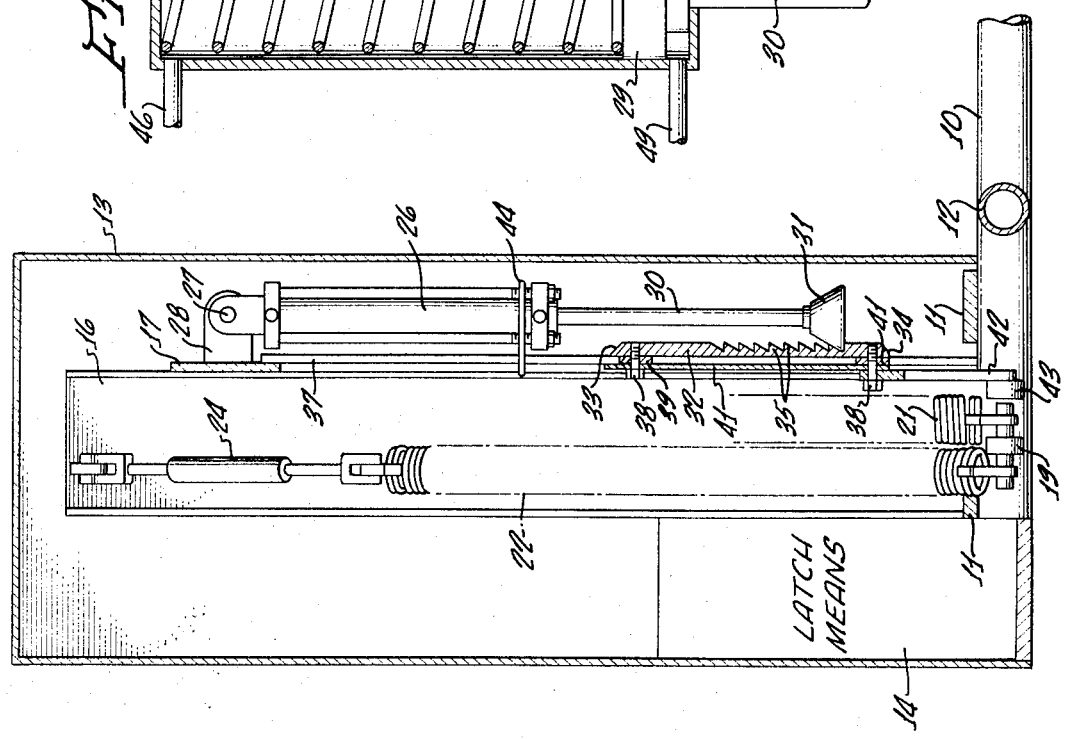
FIG. 4 is a section taken on line 4—4 of FIG. 3.

Element 31 is adapted to cooperate with a combination cam and ratchet element 32. Element 32 is a vertical bar having cam surfaces 33 and 34 at the upper and lower ends thereof, and having a plurality of ratchet teeth 35 disposed in a vertical row. Each tooth 35 has a horizontal upper surface and an inclined lower surface, so that each tooth in section is generally in the nature of a sawtooth. The teeth 35 define notches each of which is adapted to receive the lower edge of frustoconical element 31, as shown in FIG. 4, in such manner that upward movement of element 32 will cause upward movement of element 31 and thus of the piston rod 30, whereas downward movement of element 32 will cause ratcheting of element 31 to another notch.

Track means are provided to guide the movement of element 32, to assure that it travels only in a prescribed vertical path. The track means comprise parallel vertical bars 36 and 37 which are connected to cross members 17 and 18 and are spaced apart in order that a vertical slot will be provided therebetween. Such slot is narrower than the width of element 32, so that edge regions of element 32 ride along edge regions of the forward faces of bars 36-37. Bolts 38 and spacers or shoes 39 extend through the slot between bars 36-37, the bolts connecting to a plate 41. The width of plate 41 is greater than that of the slot, so that the edges of such plate slide along the rear faces of elements 36-37. The spacers 39 are slightly narrower than the slot, and are somewhat thicker than bars 36-37, the result being that the entire assembly can move up and down the tracks formed by bars 36-37, in response to the actuating forces indicated below.

To actuate the assembly comprising the cam and ratchet element 32, etc., a link 43 is pivotally connected to the lower bolt 38. The lower end of link 42 pivotally connects to a crank 43 on shaft 10, such crank being parallel to crank 19. The relationships are such that, when the gate 12 (and thus shaft 10) is pivoted 90° in either direction from the closed position of FIGS. 1-2, crank 43 moves to a horizontal position and pulls element 32 downwardly from the position of FIGS. 1-2 to that of FIGS. 3-4. Conversely, upward movement of gate 12 from the open position to the closed position of FIGS. 1-2, in response to operation of the springs 21-22, causes upward pivotal movement of crank 43 to this slide element 32 and associated parts in an upward direction.

Spring means are provided to cause the lower edge of frustoconical element 31 to seat in a notch between two adjacent teeth 35, each time such teeth are adjacent the element 31. In the illustrated embodiment, the spring means comprise a helical tension spring 44 which is caused to encircle cylinder 26 and bars 36-37 in the manner of a garter, to thereby bias the elements 26, 30 and 31 in a clockwise direction as viewed in FIGS. 2 and 4.

THE HYDRAULIC SYSTEM ASSOCIATED WITH CYLINDER 26

A liquid line 46 connects the upper end of cylinder 26 to the right side of a flow-control valve 47. The left side of valve 47 is connected through two series-connected liquid lines 48-49 to the lower end of cylinder 26. A reservoir 51 for hydraulic fluid is connected to the junction between lines 48-49.

Referring to FIG. 6, which shows valve 47 schematically, the ends of lines 46 and 48 are connected by series-related flow passages 52-53 which are joined by a conical chamber 54 containing the conical lower end of a needle valve element 56. Thus, the adjusted position of needle valve element 56 determines the rate of flow of liquid between elements 46 and 48 through passages 52-53.

Passages 52-53, and thus passages 46 and 48, are also connected by a shunt or bypass passage 57 in which is incorporated a check valve 58. Valve 58 only permits liquid to flow in a direction from passage 48 to passage 46, not in the reverse direction.

When piston 29 (FIG. 5) is moving upwardly, in response to upward movement of the gate and thus of piston rod 30, liquid flows from the upper portion of cylinder 26 through line 46 to the right end of valve 47, and then flows through the needle valve chamber 54 to line 48 and thence through lines 48 and 49 to the lower end of the cylinder 26. Because of the presence of check valve 58, which prevents the liquid from passing through bypass passage 57, the liquid flow is slow and is determined by the exact setting of needle valve element 56. It follows that upward movement of the gate, so long as the cylinder and piston assembly is operatively connected thereto, is very slow and is controlled precisely by the setting of element 56.

Reverse or downward movement of piston 29 and associated parts is effected by a helical compression spring 59 (FIG. 5) in the upper portion of cylinder 26. Such spring (which is much less strong than are springs 21-22) forces the piston 29 downwardly to expel liquid from the lower region of the cylinder, thus causing upward flow of liquid through lines 49-48 to the left side of valve 47. The liquid then flows in parallel through passages 53-52 and 57 to the line 46 and thus to the upper end of the cylinder 26. Because the bypass passage 57 is then in operation, this return flow of liquid is quite fast, the result being that the spring 59 can push the piston 29 and associated parts downwardly at a less slow rate. It is emphasized that the downward movement of the piston 29 is relatively rapid when the piston is in an upper position at which the spring 59 is compressed. However, when the piston 29 is in a relatively low position, the downward return movement of the piston 29 is slower due to the decreased force exerted by spring 59.

OPERATION

Let it be assumed that the gate is initially in the fully closed and latched condition of FIGS. 1-2. As described in the cited applications, the driver in the vehicle unlocks the gate, and operates the latch means 14, to permit the vehicle to push the gate barrier 12 over (in either direction) from the vertical condition of FIG. 2 to the horizontal condition of FIG. 4. Such opening movement of the gate is opposed by the two springs 21-22, and is accompanied by downward movement of the cam and ratchet element 32 due to the operation of crank 43 and link 42. The element 32 moves downwardly sufficiently far that the upper end thereof is clear of cylinder 26, and also sufficiently far that the lower edge of frustoconical element 31 is adjacent one of the notches between two teeth 35. Preferably, the mechanism is so set that, when the gate is fully open, the lower edge of element 31 is adjacent the lowermost notch, as shown in FIGS. 3 and 4, and is biased into such notch due to the operation of the garter spring 44.

Because element 31 is then in the lowermost notch as shown in FIGS. 3-4, or in any other notch, there is a connection between element 32 and piston 29 (FIG. 5), the result being that upward movement of the gate is opposed and retarded by the hydraulic forces resulting from the necessity of liquid flow from the upper end of cylinder 26 through the constricted flow-control valve 47 and back to the lower end of the cylinder. Therefore, and due to the upward bias of springs 21-22, the 12 pivots upwardly but only at a slow rate which is determined by the setting of valve 47. This rate is caused to be sufficiently slow that the gate does not bump on the undersides of conventional motor vehicles moving at conventional speed through the gate.

When the rear wheels of the vehicle pass over the gate, they again pivot it downwardly to the horizontal condition of FIGS. 3-4. Such downward pivotal movement is not, however, accompanied by a sudden downward shifting of piston rod 30 (which sudden shifting may through rapid downward movement of piston 29 cause harmful cavitation of the hydraulic fluid in the hydraulic system, with resultant erratic operation of the speed control). Instead of pulling downwardly on the element 30, the downward movement of element 32 has the effect of shifting element 32 downwardly past element 31 in the manner of a ratchet. Thus, instead of being engaged with the lowermost one of the notches between teeth 35, the lower edge of element 31 becomes engaged with a higher notch on element 32.

After the rear wheels pass over gate barrier 12, springs 21-22 again effect upward shifting of the gate and cause corresponding movement of the elements 30-32. Such movement is at a slow rate, against the hydraulic drag in the damper system.

Slow upward movement of element 32 (and thus of elements 31 and 30, etc.) continues until the cam surface 33 at the upper edge of element 32 engages the lower end of cylinder 26 and cams such lower end in a counterclockwise direction as viewed in FIGS. 2 and 4, thus disengaging element 31 from the teeth 35. As soon as such disengagement occurs, gate 12 pivots upwardly rapidly, due to the bias of springs 21-22, until the gate 12 is vertical and is held and latched by latch means 14. Because of this rapid movement of the gate 12 after the element 31 disengages from teeth 35, the problem of excessive friction in the system (and which opposes the slow movement of the gate, particularly when the gate approaches its dead-center position at which the spring bias of springs 21-22 is minimum) is eliminated.

If a tandem truck-trailer, or a series of adjacent vehicles, passes through the gate, the gate barrier is repeatedly pressed downwardly by each set of wheels of each vehicle. This, however, does not result in malfunction of the present apparatus, one reason being that, when element 31 is engaged with one of the notches toward the upper end of element 32, the spring 59 (FIG. 5) is loaded to a much greater degree than when element 31 is engaged with a lower one of the notches. Accordingly, downward ratcheting movement of element 32 (caused by movement of each set of vehicle wheels over the gate) will be accompanied by relatively rapid downward shifting of elements 30–31 due to such relatively high degree of loading of spring 59. This downward movement of elements 30–31 is not sufficiently rapid to cause cavitation of the hydraulic fluid, but is sufficiently rapid to insure that element 31 will always be adjacent one of the notches between teeth 35 after the gate is pivoted downwardly by any set of vehicle wheels.

The lower cam surface 34 cooperates with the frusto-conical surface of element 31 to move the latter out of the way of the downwardly moving element 32, in the event that the setting of the apparatus is such that surface 33 disengages the lower end of cylinder 26 before the lower region of element 32 engages the edge of element 31.

Should changes in conditions in the system, or changes in other parameters, dictate that the upward movement of the gate be more slow or more rapid than when the gate was originally installed, it is merely necessary for the operator to adjust the needle valve element 56 in order to change the rate of fluid flow through passages 52–53, FIG. 6. The necessary precise control of the rate of return movement is thus achieved.

As one example, the present gate may be identical to the one described in said copending application Ser. No. 233,471, inventor John H. Walls, except that the present spring means 21–22, etc., are employed instead of the gravity-bias means described in the Walls application.

The foregoing detailed description is to be clearly understood as given by way of illustration and example only, the spirit and scope of this invention being limited solely by the appended claims.

What is claimed is:

1. A horizontal-axis gate for motor vehicles, which comprises:
    a. a horizontal shaft which is mounted for rotation about a horizontal axis,
       said axis being disposed relatively adjacent the surface of the roadway,
    b. a barrier connected to said shaft and extending upwardly and generally vertically when in closed roadway-blocking condition,
    c. support means provided at the side of the roadway adjacent one end of said barrier,
    d. a fluid cylinder having its upper end pivotally connected to said support means and extending downwardly toward said shaft,
    e. a piston disposed in said cylinder and connected to a piston rod which extends downwardly below the lower end of said cylinder,
    f. a pawl mounted at the lower end of said piston rod,
    g. cam and ratchet means mounted on said support means adjacent said cylinder,
       said cam and ratchet means being adapted to move upwardly and downwardly along a predetermined path,
    h. means to associate said cam and ratchet means with said barrier in such manner that said cam and ratchet means moves downwardly upon opening of said barrier and moves upwardly upon closing thereof,
    i. means to engage said pawl with the ratchet portion of said cam and ratchet means when said pawl is disposed at the same elevation as said ratchet portion, and
    j. bias means to effect upward movement of said barrier to closed condition after a vehicle has passed through the gate,
       said cylinder and piston being adapted, when said pawl is engaged with the ratchet portion of said cam and ratchet means, to retard the upward movement of said barrier in response to operation of said bias means,
       said cam and ratchet means incorporating a cam portion adapted to effect disengagement of said pawl from said ratchet portion of said cam and ratchet means after said barrier has pivoted upwardly to a predetermined inclined condition,
         whereby said barrier may then spring freely upwardly to closed condition in response to operation of said bias means.

2. The invention as claimed in claim 1, in which said bias means for said barrier comprises spring means connected between said support means and a crank on said shaft.

3. The invention as claimed in claim 1, in which said cylinder is a hydraulic cylinder, in which conduit means are provided to connect opposite ends of said cylinder to each other, and in which adjustable flow-control means are provided to control the rate of flow of hydraulic fluid through said conduit means and thereby control the rate of closing of said barrier while said barrier is below said predetermined inclined condition.

4. The invention as claimed in claim 3, in which said flow-control means comprises a bypass passage and check valve adapted to permit relatively rapid flow of hydraulic fluid through said conduit means in response to downward movement of said piston and piston rod.

5. The invention as claimed in claim 1, in which spring means are provided to fully extend said piston rod.

6. The invention as claimed in claim 1, in which said cam and ratchet means comprises a vertical element having a plurality of ratchet teeth disposed at progressively higher elevations, and also having a cam surface at the upper region thereof and adapted to cam said cylinder outwardly until said pawl disengages said teeth.

7. The invention as claimed in claim 6, in which said cylinder is a hydraulic cylinder, and in which each of said teeth has an upper surface adapted to positively engage said pawl to drive said pawl and thus said piston rod and piston upwardly in response to upward movement of said barrier, and has a lower surface adapted to permit ratcheting of said cam and ratchet means relative to said pawl when said barrier moves downwardly to thus effect downward movement of said cam and ratchet means, whereby said pawl is not pulled downwardly when said barrier is shifted to open condition and therefore does not effect cavitation of the hydraulic fluid.

8. The invention as claimed in claim 1, in which said bias means for said barrier comprises first and second elongated tension springs connected to a crank associated with said barrier, said springs extending upwardly and diverging relative to each other at an acute angle, said springs extending away from opposite sides of a plane containing said barrier when said barrier is in closed condition.

9. The invention as claimed in claim 1, in which lockable means are provided to latch said barrier when it is in upwardly-extending closed condition, said latch means being adapted to be unlocked and operated by a person sitting in the driver's seat of a vehicle parked adjacent said gate.

* * * * *